(12) United States Patent
Juliano et al.

(10) Patent No.: US 11,538,355 B2
(45) Date of Patent: Dec. 27, 2022

(54) METHODS AND SYSTEMS FOR PREDICTING A CONDITION OF LIVING-BEING IN AN ENVIRONMENT

(71) Applicant: PANASONIC INTELLECTUAL PROPERTY MANAGEMENT CO., LTD., Osaka (JP)

(72) Inventors: Faye Juliano, Singapore (SG); Nway Nway Aung, Singapore (SG); Aimin Zhao, Singapore (SG); Eng Chye Lim, Singapore (SG); Khai Jun Kek, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 314 days.

(21) Appl. No.: 16/828,725

(22) Filed: Mar. 24, 2020

(65) Prior Publication Data

US 2021/0304634 A1 Sep. 30, 2021

(51) Int. Cl.
*G06F 17/00* (2019.01)
*G09B 19/00* (2006.01)
*G10L 15/22* (2006.01)
*G06F 3/01* (2006.01)
*G06K 9/62* (2022.01)
(Continued)

(52) U.S. Cl.
CPC .............. *G09B 19/00* (2013.01); *G06F 3/013* (2013.01); *G06K 9/6267* (2013.01); *G06V 40/10* (2022.01); *G06V 40/174* (2022.01); *G06V 40/20* (2022.01); *G10L 15/18* (2013.01); *G10L 15/22* (2013.01); *G09B 7/00* (2013.01)

(58) Field of Classification Search
CPC .... G06F 3/013; G06F 3/011; G06F 2203/011; G06F 3/012; G06F 3/017; G06B 19/00; G06B 7/00; G06B 5/00; G06B 7/02; G06B 23/00; G06K 9/6267; G06K 9/6271; G06K 9/6289; G06V 40/10; G06V 40/174; G06V 40/20; G10L 15/18; G10L 15/22; G10L 15/26; G10L 15/63
See application file for complete search history.

(56) References Cited

U.S. PATENT DOCUMENTS 11,176,444 B2 * 11/2021 Wall ......................... G06N 3/02
11,343,596 B2 * 5/2022 Chappell, III ......... A61B 5/165
(Continued)

FOREIGN PATENT DOCUMENTS

JP 6397250 B2 9/2018

*Primary Examiner* — Laurie A Ries
(74) *Attorney, Agent, or Firm* — McDermott Will & Emery LLP

(57) ABSTRACT

A method for predicting a condition of living-being in an environment, the method including capturing image-data associated with the at-least one person and based thereupon determining a current-condition of the person; receiving content from a plurality of content-sources with respect to said at least one person being imaged, said content defined by at least one of text and statistics; defining one or more weighted parameters based on allocating a plurality of weights to at least one of the captured image data and the received content based on the current-condition; and predicting, by a predictive-analysis module, a condition of the at-least one person based on analysis of the one or more weighted parameters.

18 Claims, 6 Drawing Sheets

(51) Int. Cl.
*G10L 15/18* (2013.01)
*G06V 40/10* (2022.01)
*G06V 40/20* (2022.01)
*G06V 40/16* (2022.01)
G09B 7/00 (2006.01)

(56) References Cited

U.S. PATENT DOCUMENTS

| | | | |
|---|---|---|---|
| 2013/0215289 A1* | 8/2013 | Vitsnudel | 348/E5.024 |
| 2016/0080485 A1* | 3/2016 | Hamedi | G06Q 50/01 |
| | | | 709/204 |
| 2017/0095192 A1* | 4/2017 | Sadowsky | A61B 5/0205 |
| 2017/0213190 A1* | 7/2017 | Hazan | G10L 15/1815 |
| 2019/0026786 A1* | 1/2019 | Khoury | G06Q 30/0277 |
| 2020/0219295 A1* | 7/2020 | el Kaliouby | G06K 9/6273 |
| 2020/0327375 A1* | 10/2020 | Naveh | G06K 9/623 |
| 2021/0065854 A1* | 3/2021 | Hanold | A61B 5/14532 |
| 2021/0097267 A1* | 4/2021 | Stokman | G06V 40/20 |
| 2021/0272297 A1* | 9/2021 | Chen | G06T 7/33 |
| 2021/0358324 A1* | 11/2021 | Lahiri | G09B 5/00 |
| 2022/0058669 A1* | 2/2022 | Yin | G06Q 30/0202 |

\* cited by examiner

METHODS AND SYSTEMS FOR PREDICTING A CONDITION OF LIVING-BEING IN AN ENVIRONMENT

TECHNICAL FIELD

The present invention relates to monitoring a living-being in an environment, and particularly relates to predicting condition of the living-being in the environment.

BACKGROUND

Human-beings spend a substantial part of their lives in environments such as workplace, study centers, communities etc. where they are often evaluated for merit, focus, concentration, performance, etc. One of such environment is classrooms. With the advent in education sector and new teaching standards, the expectation from an instructor or teacher is gradually increasing from being an educator towards being an overall student-manager.

As a result of this, the teachers are often expected to look into a huge-variety of aspects or attributes related to the students. Such aspects include students' behavior, focus, level of engagement to name a few. Such factors are needed to be in check so as to evaluate the students holistically. Owing to multiplicity of students in a class and a wide variety of factors needed for consideration, the job of teachers has become arduous more than ever.

The capabilities of the teachers despite having been applied to the best level are often found to be short of targets. As a matter of fine practices, the role of teachers is now getting supplement by automation such as artificial-intelligence to offset the shortfall. One such method is using machine learning to analyze the students and predict in real-time about their focus and concentration levels among other things. Variety of information logging means may be used to capture a profile of student in the class and thereby output a state of the students in real-time. In an example, the facial-expression, body posture and body language are often analyzed to compute current state of the mind.

However, such method hold applicable to find a current state of mind and are unable to predict the student behavior in near or far future. More specifically, the captured-parameters also fall-short of accurately drawing any future prediction, should the existing monitoring system were to be scaled or upgraded for prediction.

In an example, the concentration (average-value) substantially depending on the class situation such as regular-lectures and person to person (P to P) style-class. For example, concentration in regular lecture is found to be lesser than P to P style-class. Accordingly, the conventional method at-least does not take into account the difference in class-situation.

Thus, there exists a need to predict a future-behavioral characteristics of the human beings in an environment such as a classroom or workspace.

Further, there lies a need to take into account a plurality of scenarios existing within the environment to draw a reliable and accurate prediction.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting a condition of living-being in an environment.

In accordance with some example embodiments of the inventive concepts, a method for predicting a condition of living-being in an environment is disclosed. The method includes capturing image-data associated with the at-least one person and based thereupon determining a current-condition of the person. The method includes receiving content from a plurality of content-sources with respect to said at least one person being imaged, said content defined by at least one of text and statistics. The method further includes defining one or more weighted parameters based on allocating a plurality of weights to at least one of the captured image data and the received content based on the current-condition. The method also includes predicting a condition of the at-least one person by a predictive-analysis module based on analysis of the one or more weighted parameters.

In accordance with some example embodiments of the inventive concepts, a method for predicting a future-condition of living-being in an environment is disclosed. The method includes capturing images associated with the at-least one person. The method includes determining a current-condition of the at least one person based on a first sensing criteria based on said one or more images. The method includes receiving content from a plurality of content-sources with respect to said at least one person during said imaging. The method further includes predicting a future-condition of the at-least one person, said predicting including allocating one or more weights to the received content based on the current-condition. The method also includes executing a second sensing criteria to output the future-condition as the predicted condition based on the current-condition and the weighted received-content.

In accordance with some example embodiments of the inventive concepts, a system for predicting a future-condition of living-being in an environment is disclosed. The system includes an imaging sensor configured for capturing images associated with the at-least one person. The system includes a first sensing model configured for determining a current-condition of the at least one person based on based on said one or more images. The system includes a second sensing model configured for receiving content from a plurality of content-sources with respect to said at least one person during said imaging. The second sensing model further predicts a future-condition of the at-least one person, said predicting including allocating one or more weights to the received content based on the current-condition and output another condition as the predicted condition based on the current-condition and the weighted received-content.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

Figure 1:
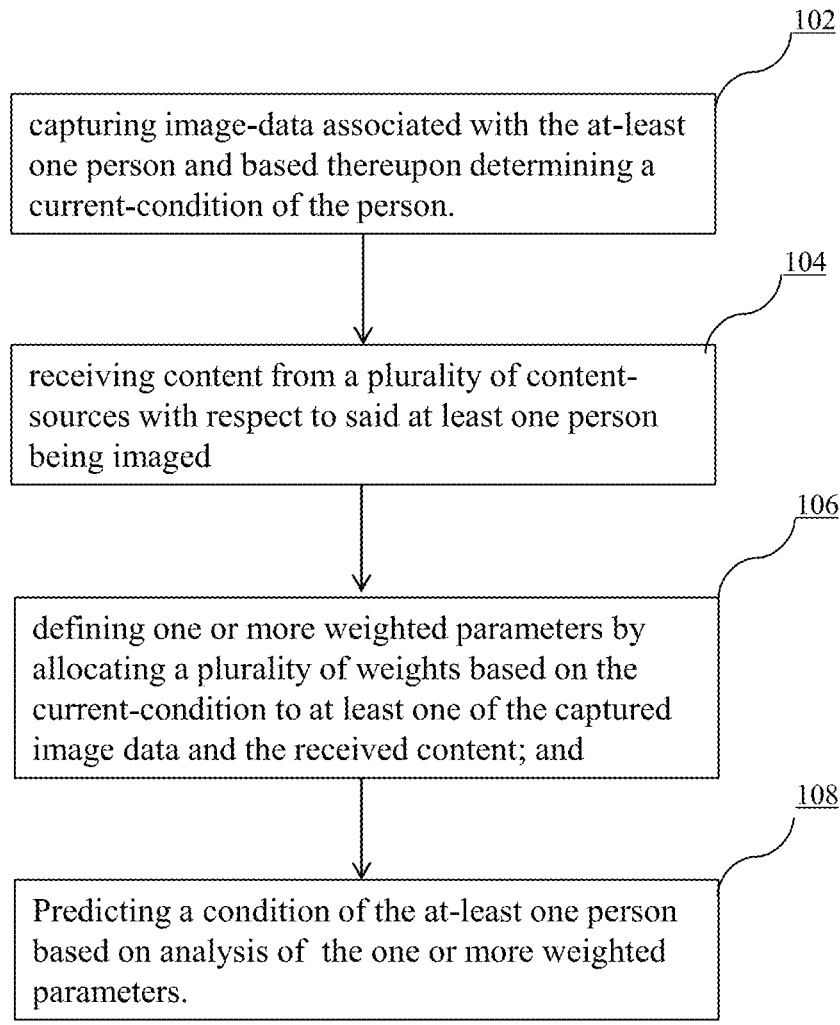
FIG. 1 illustrates a method predicting a condition of living-being in an environment, in accordance with the embodiment of the present disclosure.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present subject matter are described below in detail with reference to the accompanying drawings.

FIG. 1 illustrates a method 100 for predicting a condition of living-being in an environment, in accordance with the embodiment of the present disclosure. In an example, said living-being may be a person posing as student or a professional and the environment may be a learning-environment. The method 100 includes determining a current-condition of the at least person based upon image-data related to the at least one person. The method 100 further includes receiving content associated with the at least one person and allocating a number of weights to the image-data. The method 100 further includes predicting the condition of the at least one person.

At block 102, the method 100 includes capturing image-data associated with the at-least one person and based thereupon determining the current-condition of the person. In an implementation, the image-data is extracted from a number of images captured by an imaging sensor such as a camera, a video recorder, an infra-red imaging camera, a time of flight sensor (TOF) or the like. The image-data may be at least one of a head-pose, gaze, expression, a body-posture, and a displacement of the at-least one person. A first sensing model receives the images from the imaging sensor and determines the current-condition of the at least one person based on the images. The first sensing model may be based upon machine learning criteria based on image classification and recognition. In an example embodiment, the current-condition may be defined by at least one of concentration, boredom, anxiety, different mental-characteristic or the like.

At block 104, the method 100 includes receiving content from a number of content-sources related to the at least one person being imaged. The content may be defined by at least one of text and statistics such as an exam-Score, an evaluation report, a text-communication, a peer-to-peer communication, learning websites, chat platforms, online forum associated with the at least one person or the like. The content is captured electronically from sources such as online repositories, databases, remote-web server, application programing interfaces to fetch online content or the like.

At block 106, the method 100 includes defining one or more weighted parameters. The weighted parameters are based on allocating a plurality of weights to at least one of the captured image data and the received content based on the current-condition.

At block 108, the method 100 includes predicting the condition of the at-least one person by a predictive-analysis module also referred as a second sensing model, based on the analysis of the one or more weighted parameters. In an example embodiment, the second sensing model predicts the condition of the at least one person by allocating one or more weights to the received content based on the current-condition. The second sensing model further executes a second-sensing criteria to output the future-condition as the predicted condition based on the current-condition and the weighted received-content. In an example embodiment, predicting the condition may include a natural language processing (NLP) criteria to interpret natural-language and/or forming a part of the captured content. In another example embodiment, predicting the condition may include an automatic speech recognition (ASR) criteria to interpret audible natural-language forming a part of the captured content. The second sensing model further renders an opinion related to the at least one person on the basis of an activity-engagement, an overall-attention within the environment, a suggestion for imparting learning to the at least one person, a counselling requirement or the like.

Figure 2:
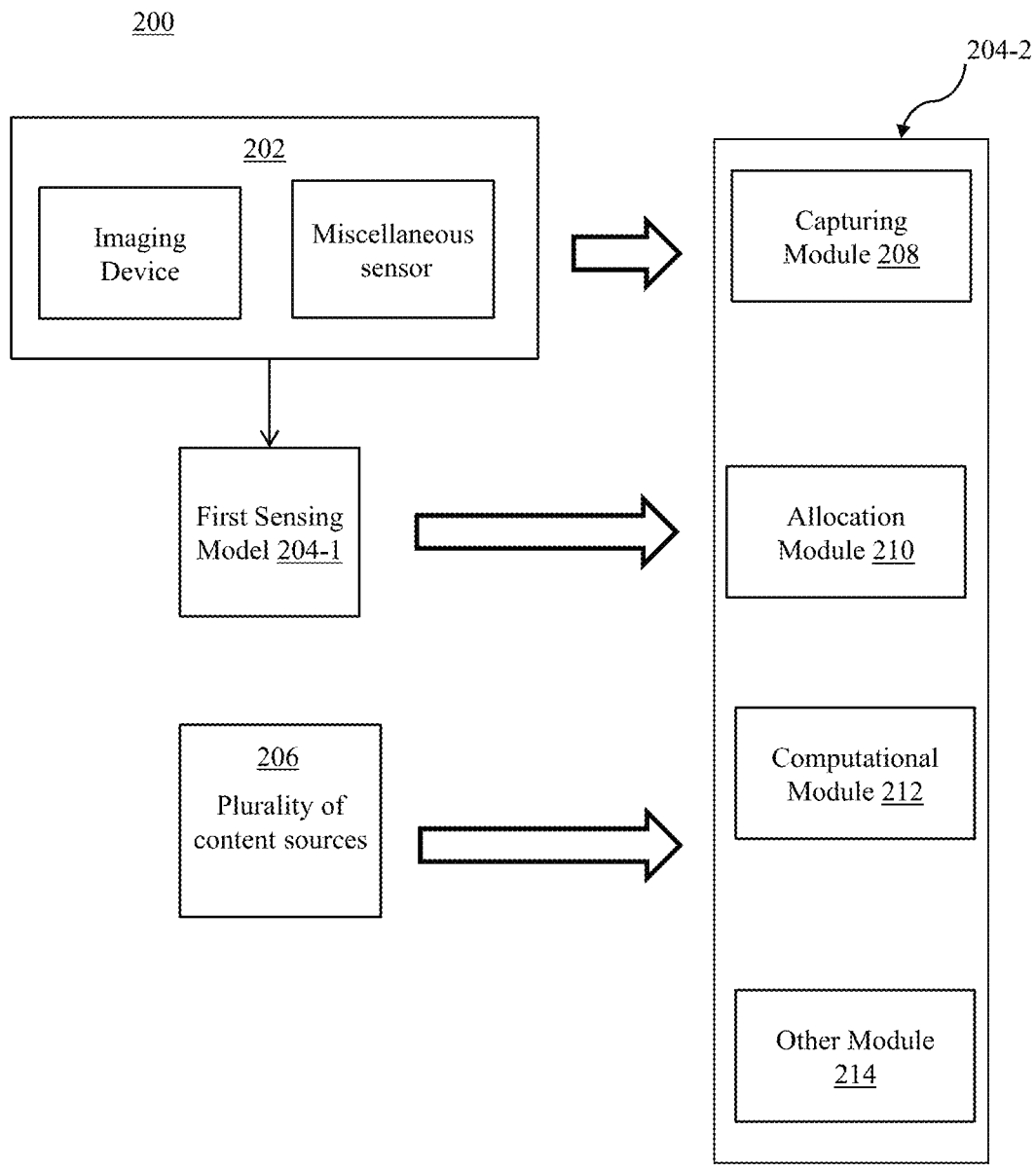
FIG. 2 illustrates a schematic-architecture for predicting a condition of living-being in an environment, in accordance with an embodiment of the present disclosure.

FIG. 2 illustrates a schematic-architecture 200 for predicting a condition of living-being in an environment. In an example embodiment, the living-being may be a person. The architecture 200 includes a number of sensors 202 measuring parameters with respect to the at least one person and the environment around the at-least one person. In an example, the sensor may be an imaging device for capturing images of the living beings within the environment and execute the method step 102. In other examples, the sensors may be acoustic sensor, light sensor, infra-red sensor, a grid eye sensor etc. for supplementing the capturing of images and other ancillary data.

The imaging device 202 captures a number of images of the at least one person. In an example embodiment, the imaging device 202 may be a camera, a video recorder, an infra-red imaging camera, a time of flight sensor (TOF) or the like. Image-data associated with the at least one person is extracted from the number of images. The image data may be at-least one of a head-pose, gaze, expression, a body-posture, and a displacement of the at-least one at least one. The first sensing model 204-1 receives the images captured by the imaging device 202 and determines the current-condition of the at least one person based upon the image-data associated with the at least one person extracted from the images.

The imaging device 202-may further capture a number of images of the at least one person for extracting the image-data associated with the at least one person from the images and send the image-data to the first sensing model 204-1.

In an example embodiment, the first-sensing model 204-1 may be capable of determining a current condition of the at least one person and accordingly execute the method step 102. The architecture 200 further includes a second sensing model 204-2. The second sensing model 204-2 is capable of receiving content from a plurality of content sources via step 104 for predicting the condition of the at-least one person in the environment by executing the method steps 106 and 108. The second sensing model 206 receives sensed data from the sensors 202 and the current-condition from the first sensing model 204-1 for predicting the condition of the at least one person in the environment.

In an example embodiment, the conditions as determined in real time and/or predicted for future may be defined by at least one of concentration, boredom, anxiety, different mental-characteristic or the like. In an example embodiment, predicting the condition may include a natural language processing (NLP) criteria to interpret natural-language and/ or forming a part of the captured content. In another example embodiment, predicting the condition may include an automatic speech recognition (ASR) criteria to interpret audible natural-language forming a part of the captured content. The second sensing model 204-2 is a deep learning or neural network based machine learning criteria and comprises at least one of a natural language processor and an automatic speech recognizer.

The second sensing model 204-2 may further render an opinion related to the at least one on the basis of an activity-engagement, an overall-attention within the environment, a suggestion for imparting learning to the at least one person, a counselling requirement or the like.

The second sensing model 204-2 includes a capturing module 208, an allocation module 210 and a computational module 212. In an example embodiment, the capturing module 208 captures content from a number of content-sources 206 related to the at least one person. The content may be defined by at least one of text and statistics such as an exam-Score, an evaluation report, a text-communication, a peer-to-peer communication, learning websites, chat platforms, online forum associated with the at least one person or the like. The content is captured electronically from sources such as online repositories, databases, remote-web server, application programing interfaces to fetch online content or the like. In other words, the content is fetched by the second sensing model 204-2 by tracking activities of the at least one person over the plurality of online platforms The allocation module 212 determines a weighted parameter on based allocating a number of weights to the captured image-data based on the current-condition of the at least one person. The computational module 210 computes/processes the received data on the basis of the weights allotted to the image-data and predicts the condition of the at least one person. The miscellaneous or other module 214 facilitates cooperation among the modules 208, 210 and 212.

Figure 3:
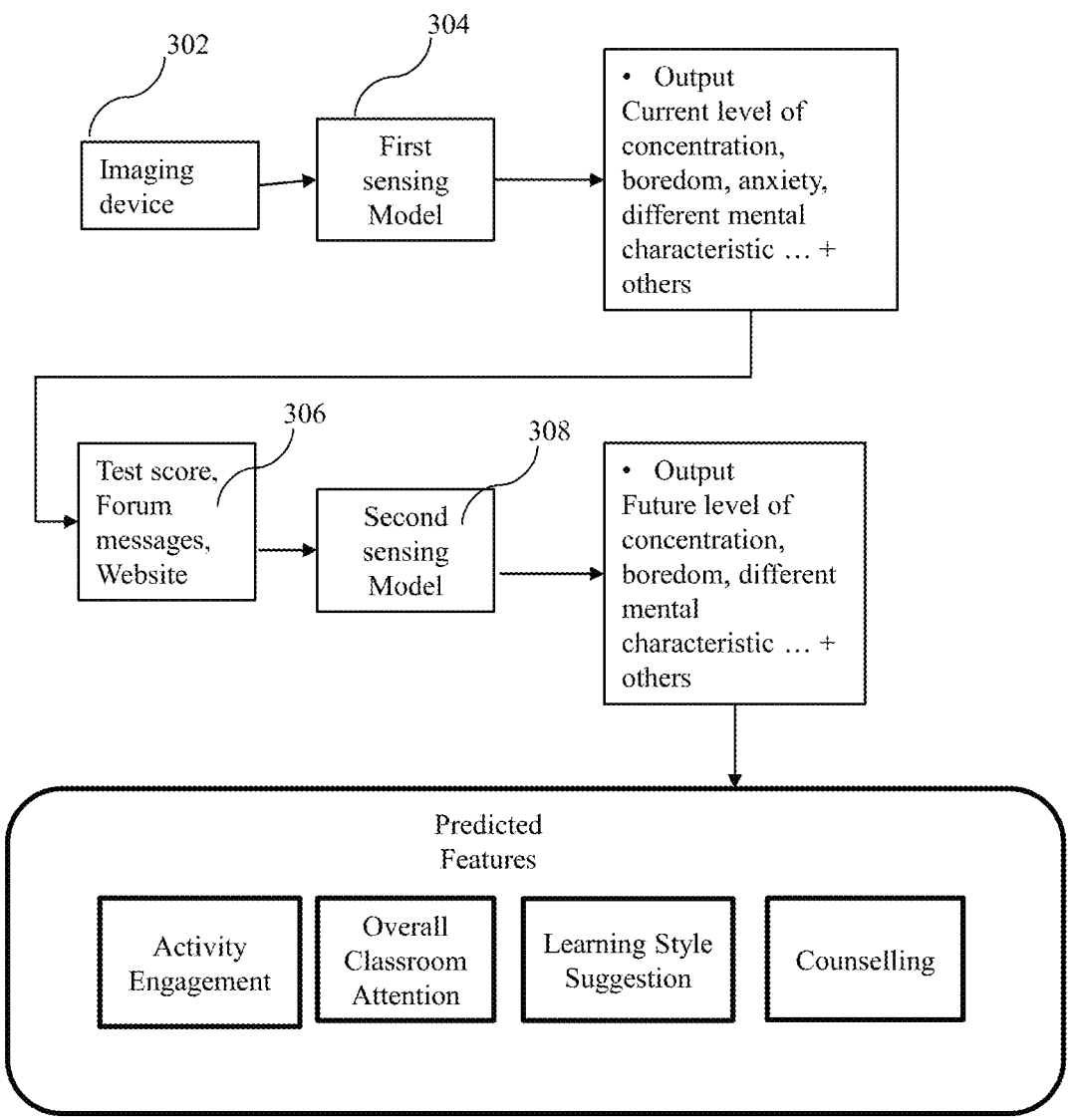
FIG. 3 illustrates a method predicting a condition of living-being in an environment, in accordance with another embodiment of the present disclosure.

FIG. 3 illustrates a method for predicting a condition of living-being in an environment, in accordance with another embodiment of the present disclosure. More specifically, the present subject matter illustrates a method for predicting a future-condition of living-being in an environment.

Step 302 corresponds to capturing images associated with the at-least one person and accordingly corresponds to step 102. In an example, step 302 also comprises determining an image data based on the captured images as at least one of a head-pose, gaze, expression, a body-posture, and a displacement of the at-least one person. The image data may be obtained from the sensors 202. In other example, non-image data for example acoustic data may be obtained from other type of non-imaging sensors 202.

Step 304 corresponds to determining a current-condition of the at least one person based on a first-sensing model 204-1 based on said one or more images and accordingly corresponds to step 102. The current-condition corresponds to a current behavioral-condition defined by one or more of: concentration, boredom, anxiety, different mental-characteristic.

Step 306 corresponds to receiving content from a plurality of content-sources with respect to said at least one person during said imaging and accordingly corresponds to step 104. In an example, the content may be test score, online form messages as exchanges through internet, social-network website data, any other written communication as logged and electronically-available through a computing system.

Step 308 corresponds to operation of the second sensing module 204-2 and accordingly corresponds to step 106. Step 308 comprises allocating one or more weights to the received content based on the current-condition and also stands further elaborated in FIG. 5. More specifically, the content in the form of text and image data are subjected to weighted-summation to extract a weighted sum or weighted mean that is further subjected to analysis by a deep learning criteria in next step 310

At step 310 that corresponds to the step 108, the weighted sum as received in step 308 undergoes processing by the second sensing model 204-2 alongside the current-condition as outputted by the first sensing model 204-1. Accordingly a future condition is predicted with respect to at least one person as a future behavioral condition defined by one or more of: future concentration, boredom, anxiety, different mental-characteristic In an example, the execution of second sensing model 204-2 also comprises execution of an automatic speech recognition (ASR) criteria and/or a natural language processing (NLP) criteria and/or to interpret natural-language or utterance spoken in natural language forming a part of the captured content as received and weighted in steps 306 and 308.

In step 310, the second sensing model 204-2 further predicts other example parameters that are specific to a classroom environment includes Level of Engagement in activities, Level of Concentration, Level of Group Concentration. Recommend Learning Styles, Necessity of counselling.

Figure 4:
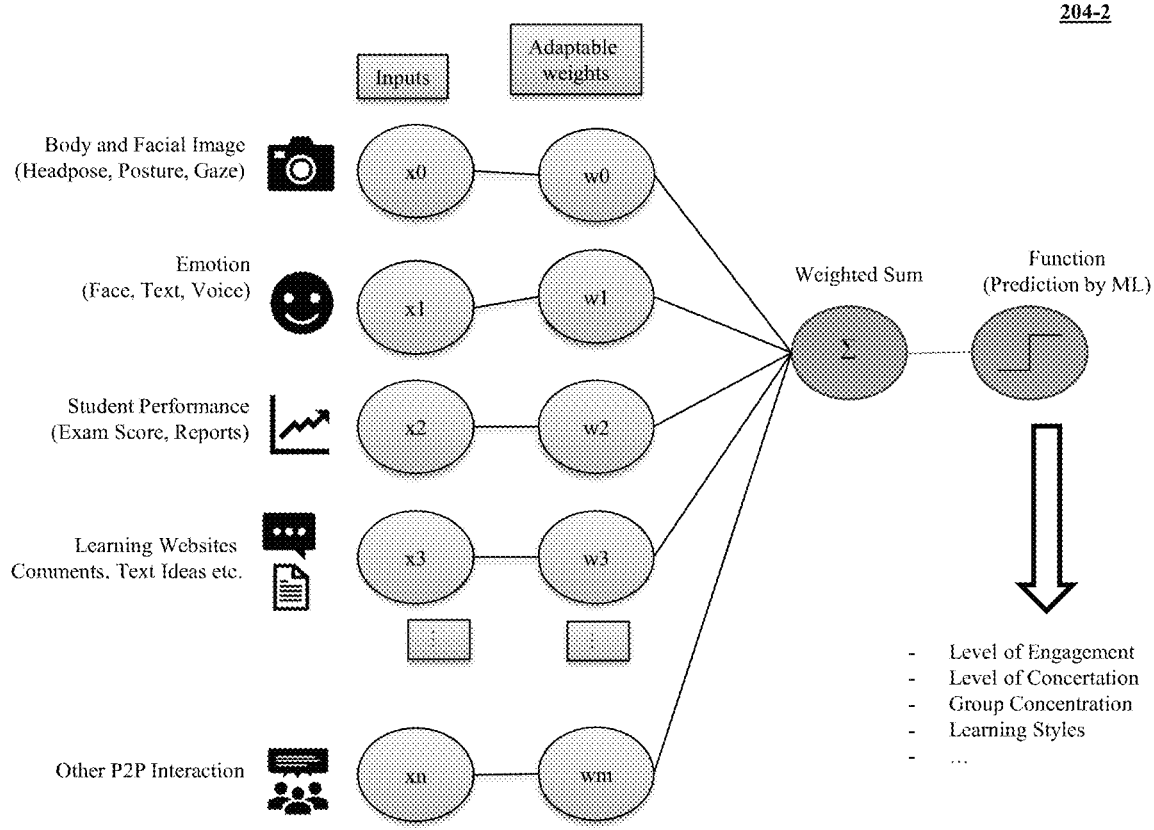
FIG. 4 illustrates an example operation of a second sensing model, in accordance with another embodiment of the present disclosure.

FIG. 4 illustrates an example operation of a second sensing model, in accordance with another embodiment of the present disclosure. More specifically, the present figures illustrate allocation of weights to the various parameters.

As shown in the figure, various type of inputs for the student as captured by the sensors 202 denote image data, captured emotions, person to person interaction etc. which have been correspondingly marked as inputs x0, x1, xn etc. The text relevant to be captured from the content sources 206 denote the student performance, learning website content, etc that have been denoted as x2 and x3, respectively.

Based on the current condition determined, the inputs x1 to xn may be allocated different weights w1 to wn based upon the current condition as determined by the first sensing model 204-1. For example, with respect to a current concentration estimated by a 1st AI model 204-1, the inputs are movement or expression of classmates. With respect to a future concentration estimated by a 2nd AI model 204-2, the input is text information of classmates. Accordingly, a weight imparted to "movement of expression of classmates" may be substantially more than "text information" in case the current concentration is determined to be very LOW. However, in case the current concentration is determined as HIGH, the weights allocated to the "text content" may be substantially more than the "movement based input". In other example, different weights may be allocated to the different parameters based on "minimization of costs function".

For predicting the condition of the at least one person, the second sensing model 204-2 calculates a weighted sum or weighted mean and subjects the output to analysis by a function such as deep leaning criteria, neural network, regression etc. In other example, minimum, maximum, average, standard deviation based procedures may be employed instead of weighted summation. The second sensing model 204-2 further renders an opinion related to the at least one person on the basis of an activity-engagement, an overall-attention within the environment, a suggestion for imparting learning to the at least one person, a counselling requirement or the like.

Figure 5:
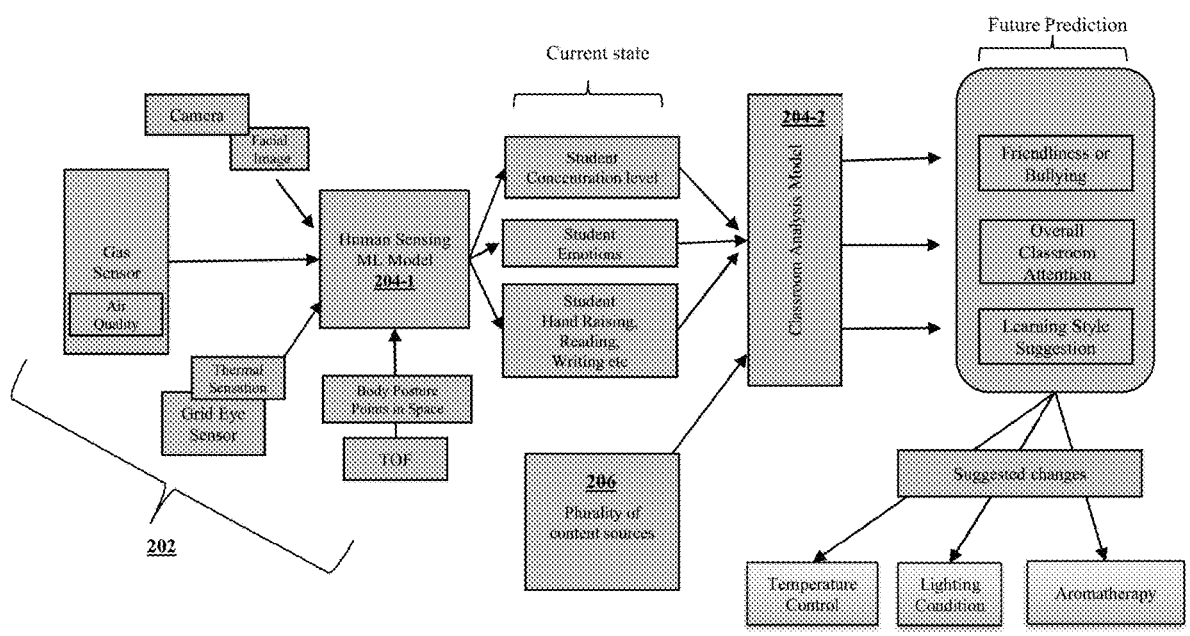
FIG. 5 illustrates an example implementation of the present method steps in a classroom environment, in accordance with another embodiment of the present disclosure.

FIG. 5 illustrates an example implementation of the present method steps in a classroom environment, in accordance with another embodiment of the present disclosure. More specifically, the present implementation at-least involves sensing student's emotion, boredom and anxiety while doing different tasks in blended learning classroom (solo study, group study, peer to peer interaction) so as to modify classroom environment as an improvement measure and render insights to teachers about the teaching methodology.

The sensors 202 in present example may be an imaging camera for imaging, TOF sensor for determining body posture, environmental gas sensor for air-quality measurement, Lighting sensor for measuring ambient light, and a Grid-Eye sensor for thermal-imaging etc. Accordingly, the first sensing module 204-1 sensing module determines the current condition as concentration, student emotion, student gestures, anxiety etc. Based on the current condition and the content captured from content sources 206, the second sensing module 204-2 predicts various classroom-environment based parameters such as Level of Engagement, Group Concentration, Learning Styles, Bullying or friendly scenario in class. As a part of such drawn prediction, the second sensing module 204-2 may also recommend changes such as temperature control, lightening control, aroma therapy for augmenting classroom environment.

In an example with respect to classroom environment, the present implementation renders a higher accuracy of human sensing technology for an educational environment. The method aims to output and predict as follows:

Individual analysis report on how each students emotions in the classroom and a correlation drawn to its current performance. (i.e. test score, ideas and text analysis in Social Learning Websites often used by schools)

Student activity engagement and group concentration alerts and long term behavior analysis of classroom will give prediction for future.

Detection of how students interact with one another and thereby identify presence of boredom or anxiety in doing tasks.

Accurate student-sensing in different classroom station and classroom scenario.

Figure 6:
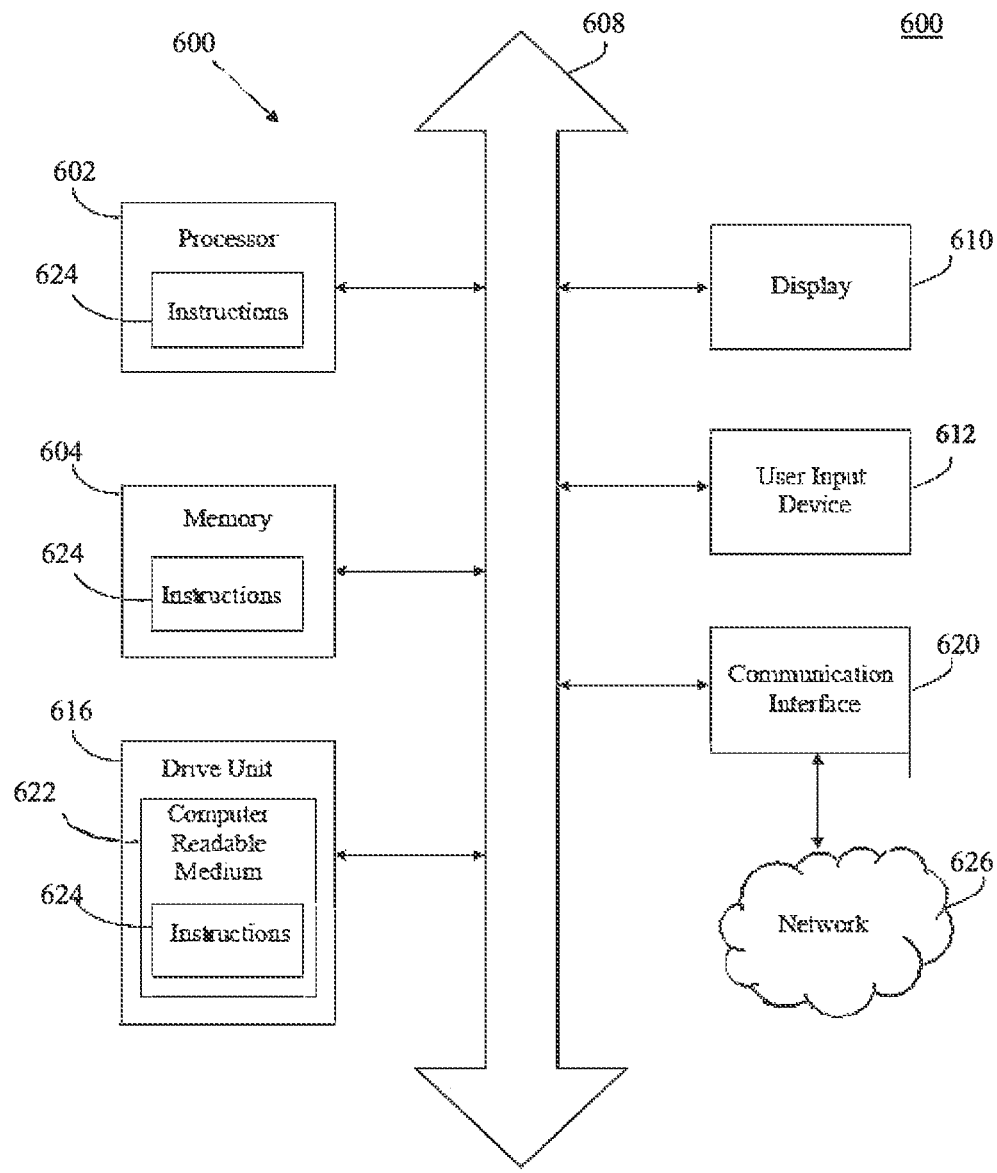
FIG. 6 illustrates an implementation of the system as illustrated in preceding figures in a computing environment, in accordance with another embodiment of the present disclosure.

FIG. 6 illustrates an implementation of the system 200 as illustrated in FIG. 2 in a computing environment. The present figure essentially illustrates the hardware configuration of the system 200 in the form of a computer system 600 is shown. The computer system 600 can include a set of instructions that can be executed to cause the computer system 600 to perform any one or more of the methods disclosed. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602 (e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data The processor 602 may implement a software program, such as code generated manually (i.e., programmed).

The computer system 600 may include a memory 604, such as a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 604 includes a cache or random access memory for the processor 602. In alternative examples, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may or may not further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 616.

Additionally, the computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600.

The computer system 600 may also include a disk or optical drive unit 616. The disk drive unit 616 may include a computer-readable medium 622 in which one or more sets of instructions 624, e.g. software, can be embedded. Further, the instructions 624 may embody one or more of the methods or logic as described. In a particular example, the instructions 624 may reside completely, or at least partially, within the memory 604 or within the processor 602 during execution by the computer system 600. The memory 604 and the processor 602 also may include computer-readable media as discussed above.

The present invention contemplates a computer-readable medium that includes instructions 624 or receives and executes instructions 624 responsive to a propagated signal so that a device connected to a network 626 can communicate voice, video, audio, images or any other data over the network 626. Further, the instructions 624 may be transmitted or received over the network 626 via a communication port or interface 620 or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600 or combinations thereof. The connection with the network 626 may be a physical connection, such as a wired Ethernet connection or may be established wirelessly as discussed later. Likewise, the additional connections with other components of the system 600 may be physical connections or may be established wirelessly. The network 626 may alternatively be directly connected to the bus 608.

The network 626 may include wired networks, wireless networks, Ethernet AVB networks, or combinations thereof. The wireless network may be a cellular telephone network, an 802.11, 802.16, 802.20, 802.1Q or WiMax network. Further, the network 626 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 600.

The present subject matter at least enables prediction of concentration, boredom and different mental characteristics etc for one or more living beings in an environment. The same is at least achieved by integration of current captured characteristics with the data (e.g. Test Score, Essay, Reports, Classmate Interaction, etc) from an online-repository (for example a Learning Website) to predict future concentration level and mental state of the students. Accordingly, the present subject matter generates a concentration level- and mental characteristic (boredom, anxiety, etc), forum score as a real-time current score as well as a future score.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

We claim:

1. A method for predicting a condition of at least one person in an environment, the method comprising:
   capturing image-data associated with the at least one person and based thereupon determining a current-condition of the person;
   receiving content from a plurality of content-sources with respect to said at least one person being imaged, said content defined by at least one of text and statistics;
   defining one or more weighted parameters based on allocating a plurality of weights to at least one of the captured image data and the received content based on the current-condition; and
   predicting, by a predictive-analysis module, a condition of the at least one person based on analysis of the one or more weighted parameters.

2. The method according to claim 1, wherein the current-condition and the predicted condition are defined by one or more of: concentration, boredom, anxiety, different mental-characteristic.

3. The method according to claim 1, wherein the image data for determination of the current-condition comprises at least one of a head-pose, gaze, expression, a body-posture, and a displacement of the at-least one person.

4. The method according to claim 1, wherein the content is captured electronically from one or more sources pertaining to at least one of text and statistics, said sources defined by one of more of:
   an exam-Score, an evaluation report, a text-communication, a peer-to-peer communication, learning websites, chat platforms, online forum associated with the at least one person.

5. The method according to claim 1, wherein the predicting further comprises rendering an opinion with respect to the at least one person within an environment, said opinion defined by one or more of:
   an activity-engagement,
   an overall-attention within the environment,
   a suggestion for imparting learning to the at least one person,
   a counselling requirement.

6. A method for predicting a future-condition of at least one person in an environment, the method comprising:
   capturing images associated with the at least one person;
   determining a current-condition of the at least one person based on a first sensing criteria based on said one or more images;
   receiving content from a plurality of content-sources with respect to said at least one person during said imaging; and
   predicting a future-condition of the at-least one person, said predicting comprising:
      allocating one or more weights to the received content based on the current-condition; and
      executing a second sensing criteria to output the future-condition as the predicted condition based on the current-condition and the weighted received-content.

7. The method as claimed in claim 6, wherein the current and future-condition corresponds to a behavioural-condition defined by one or more of: concentration, boredom, anxiety, different mental-characteristic.

8. The method according to claim 6, further comprising:
   determining an image data based on the captured images as at least one of a head-pose, gaze, expression, a body-posture, and a displacement of the at least one person;
   communicating the image-data to the first sensing criteria for the current-condition determination.

9. The method according to claim 6, wherein the prediction of the future-condition comprises executing:
   a natural language processing (NLP) criteria to interpret natural-language and/or forming a part of the captured content.

10. The method according to claim 6, wherein the prediction of the future-condition comprises executing:
    an automatic speech recognition (ASR) criteria to interpret audible natural-language forming a part of the captured content.

11. A system for predicting a future-condition of at least one person in an environment, the system comprising:
    an imaging device configured for capturing images associated with the at least one person; and
    a processor coupled to a non-transitory computer-readable program medium including instructions which when executed by the processor configure the processor to function as:
    a first sensing model for determining a current-condition of the at least one person based on based on said one or more images; and a second sensing model for:
   receiving content from a plurality of content-sources with respect to said at least one person during said imaging; and
   predicting a future-condition of the at-least one person, said predicting comprising:
      allocating one or more weights to the received content based on the current-condition; and
      output another condition as the predicted condition based on the current-condition and the weighted received-content.

12. The system as claimed in claim 11, wherein the imaging device is one of a camera, a video recorder, an infra-red imaging camera, a time of flight sensor (TOF).

13. The system as claimed in claim 11, wherein the first sensing model is a machine learning criteria based on image classification and recognition.

14. The system as claimed in claim 11, wherein the content-sources are one or more of online repositories, databases, remote-web server, application programing interfaces to fetch online content.

15. The system as claimed in claim 11, wherein the second sensing model is a deep learning or neural network based machine learning criteria.

16. The system as claimed in claim 11, wherein the second sensing model comprises at least one of a natural language processor and an automatic speech recognizer.

17. The system as claimed in claim 11, wherein the second sensing model fetches content by tracking activities of the at least one person over the plurality of online platforms comprising at least one of examination platforms, chatting platforms and websites.

18. The system as claimed in claim 11, wherein the predicted condition of the at least one person by the second sensing model is defined by at least one of level of engagement, level of concentration, level of group concentration, and recommend learning styles.

* * * * *